(12) United States Patent
Rana et al.

(10) Patent No.: US 11,983,556 B2
(45) Date of Patent: May 14, 2024

(54) WORKFLOW GENERATION

(71) Applicant: HEXAGON TECHNOLOGY CENTER GMBH, Heerbrugg (CH)

(72) Inventors: Asif Rana, Widnau (CH); Roman Lampert, Göfis (AT); Bernd Reimann, Heerbrugg (CH); Utz Recke, Heerbrugg (CH); George Kenneth Thomas, Madison, AL (US); Johannes Maunz, Widnau (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 953 days.

(21) Appl. No.: 16/967,380

(22) PCT Filed: Feb. 5, 2019

(86) PCT No.: PCT/EP2019/052788
§ 371 (c)(1),
(2) Date: Aug. 4, 2020

(87) PCT Pub. No.: WO2019/149960
PCT Pub. Date: Aug. 8, 2019

(65) Prior Publication Data
US 2021/0216358 A1 Jul. 15, 2021

(30) Foreign Application Priority Data
Feb. 5, 2018 (EP) .................... 18155183

(51) Int. Cl.
*G06F 9/48* (2006.01)
*G06F 9/50* (2006.01)
(Continued)

(52) U.S. Cl.
CPC .......... *G06F 9/4843* (2013.01); *G06F 9/5044* (2013.01); *G06N 20/00* (2019.01);
(Continued)

(58) Field of Classification Search
None
See application file for complete search history.

(56) References Cited

U.S. PATENT DOCUMENTS 7,735,060 B2 6/2010 Harvey et al.
7,805,325 B2 * 9/2010 Rits .................. G06Q 10/06316
705/7.26
(Continued)

FOREIGN PATENT DOCUMENTS

EP 3156898 A1 4/2017

OTHER PUBLICATIONS

Hongmei Gou "An Agent-Based Approach for Workflow Management", Dec. 2000, IEEE, pp. 292-297. (Year: 2000).*
(Continued)

*Primary Examiner* — Romain Jeanty
(74) *Attorney, Agent, or Firm* — Maschoff Brennan

(57) ABSTRACT

A workflow generation system comprising a first device with a computing unit, a memory unit and a first communication unit, and a plurality of software agents used with electronic apparatuses comprising at least one measuring device, wherein each software agent is on an electronic apparatus or an communication module connected to the electronic apparatuses, wherein each software agent exchanges data with the electronic apparatus the first device receives a measuring task and performs a workflow generation process to receive from agents task-specific data of the apparatuses, the task—specific data information about properties of the respective apparatus, to assess task-specific capabilities associated with each of the apparatuses, generate, based on the task and on the capabilities, an optimized workflow for performing the task including workflow data allowing the respective apparatus to perform the task, and to provide the workflow data to the software agents of the involved apparatuses.

46 Claims, 4 Drawing Sheets

(51) Int. Cl.
*G06N 20/00* (2019.01)
*G06Q 10/0631* (2023.01)
*G06Q 10/0633* (2023.01)
*G06F 8/61* (2018.01)

(52) U.S. Cl.
CPC ... *G06Q 10/06316* (2013.01); *G06Q 10/0633* (2013.01); *G06F 8/61* (2013.01)

(56) References Cited

U.S. PATENT DOCUMENTS

| | | | |
|---|---|---|---|
| 10,204,311 B2 * | 2/2019 | Standing | H04L 67/10 |
| 2002/0107921 A1 * | 8/2002 | Kishimoto | G06Q 10/10 |
| | | | 709/205 |
| 2008/0005287 A1 | 1/2008 | Harvey et al. | |
| 2008/0010631 A1 | 1/2008 | Harvey et al. | |
| 2015/0212854 A1 * | 7/2015 | Tsukuda | G06F 9/4881 |
| | | | 718/102 |
| 2016/0092806 A1 * | 3/2016 | Yuki | G06F 3/1275 |
| | | | 705/7.27 |
| 2017/0090989 A1 * | 3/2017 | van Velzen | G06F 9/5083 |

OTHER PUBLICATIONS

Extended European Search Report dated Jun. 15, 2018 as received in Application No. 18155183.9.
EdgeFrontier Fact Sheet, Intergraph Corporation (2013).
EdgeFrontier Product Sheet, Intergraph Corporation (2016).
Leica Nova Ms60 Data Sheet, Leica Geosystems AG (2015).

* cited by examiner

WORKFLOW GENERATION

FIELD OF THE INVENTION

The present invention pertains to a workflow generation system and method for generating a task-specific workflow to perform a measuring task jointly on a plurality of existing devices.

SUMMARY

A system according to some aspects of the invention, in the following also referred to as "EdgeClient" (EC), provides extensible IoT edge solution, process automation, secure edge connectivity and dynamically changeable workflows. It can be used together with a system and data integration software such as "EdgeFrontier" (EF) of Intergraph. Some integration tools that can be used with EC are disclosed in documents EP 3 156 898 A1 US 2008/0005287 A1, US 2008/0010631 A1 or U.S. Pat. No. 7,735,060 B2.

It is an object of some aspects of the present invention to provide a method and system to automatically generate optimized workflows for jointly accomplishing a task by a plurality of devices and/or persons.

Particularly, it is an object of some aspects to provide such a method and system that can be used with existing devices, legacy systems, and untrained users.

It is a further object of some aspects to provide such a method and system wherein the task is a measuring task and the devices are measuring devices, particularly surveying and reality capture devices.

At least one of these objects is achieved by the system and the method according to the independent claims and/or the dependent claims of the present invention.

A first aspect of some embodiments of the invention relates to a workflow generation system comprising a first device having a computing unit, a memory unit and a first communication unit, and a plurality of software agents that are adapted to be used with a plurality of electronic apparatuses comprising one or more measuring devices. Each software agent is either installable on an electronic apparatus of the plurality of electronic apparatuses or installed on a communication module of the system that is adapted to be connected to one of the electronic apparatuses and to exchange data with the apparatus connected to. Moreover, each software agent is adapted to exchange data with the electronic apparatus it is installed on or connected to.

According to this aspect of some embodiments of the invention, said first device is adapted to receive a measuring task and to perform, upon reception of the measuring task, a workflow generation process, in the course of which workflow generation process the first device is adapted

- to request and receive from the plurality of agents task-specific data of the apparatuses, wherein the task-specific data comprises information about properties, a position and/or a workload that are associated with the respective apparatus,
- to assess, based on the task-specific data, task-specific capabilities associated with each of the apparatuses,
- to generate, based on the measuring task and on the task-specific capabilities, an optimized workflow for performing the measuring task, the workflow involving one or more of the apparatuses,
- to generate workflow data for each of the involved apparatuses, the workflow data allowing the respective apparatus to perform a part of the measuring task, and to provide the workflow data to the software agents of the involved apparatuses.

According to one embodiment of the workflow generation system, at least one of the software agents is installed on a communication module that is adapted to be connected to one of the electronic apparatuses and to exchange data with the apparatus connected to, wherein each of the communication modules comprises a communication unit adapted to communicate and exchange data with the first communication unit and other communication units of other communication modules of the system.

According to another embodiment, the system comprises one or more of the plurality of electronic apparatuses, in particular all of the electronic apparatuses.

According to another embodiment of the system, the plurality of apparatuses comprise a plurality of measuring devices. In particular, all electronic apparatuses of the system can be measuring devices.

According to another embodiment of the system, the plurality of apparatuses comprise at least one laser scanner, particularly a plurality of laser scanners.

According to another embodiment of the system, the software agents are configured to generate feedback data related to a performance of the measuring task and to provide the feedback data to the first device.

According to another embodiment of the system, the first device is configured to store feedback data related to a multitude of measuring tasks and comprises a machine-learning algorithm that is configured to evaluate the stored feedback data.

According to another embodiment of the system, the first device is configured to generate the workflow using the evaluated feedback data of the machine-learning algorithm.

According to another embodiment of the system, the first device is configured to evaluate the feedback data and to generate an improved workflow based on the feedback data and using the evaluated feedback data of the machine-learning algorithm.

According to another embodiment of the system, the improved workflow comprises repeating a part of the task by the same apparatus in a different way.

According to another embodiment of the system, the improved workflow comprises re-assigning a part of the task to another apparatus.

According to another embodiment of the system, the feedback data comprises information about errors occurring during performing the task, and the software agents are configured to generate and provide the feedback data in real time.

According to another embodiment of the system, if the task has been completed successfully, the feedback data comprises information related to the successful completion of the task.

According to another embodiment of the system, if the task has not been completed successfully, the feedback data comprises information about errors that have occurred during performing the task.

According to another embodiment of the system, the first device is adapted as a hand-held or wearable user device comprising a display, and workflow data comprising instructions for a human is displayable on the display.

According to another embodiment of the system, the instructions comprise a step-by-step guidance for the user of the first device for performing a part of the task.

According to another embodiment of the system, the system comprises at least one user device comprising a display, wherein the task-specific data associated with the user device comprise information about a user of the second user device, the task-specific capabilities associated with the user device comprise task-specific capabilities of the user of the user device, and the workflow data transmitted to the user device comprises instructions for a human.

According to another embodiment of the system, at least one device of the plurality of apparatuses is adapted as the at least one user device.

According to another embodiment of the system, the instructions comprise a step-by-step guidance for the user of the user device for performing a part of the task.

According to another embodiment of the system, the at least one user device is assigned to the at least one measuring device, and the instructions comprise a guidance for the user of the user device related to a setup of the at least one measuring device that is necessary for performing a part of the task.

According to another embodiment of the system, the user device is adapted as a hand-held or wearable device.

According to another embodiment of the system, the first device is adapted to generate the workflow also based on position information.

According to another embodiment of the system, the apparatuses comprise a localization unit adapted for determining a position of the respective apparatus and to provide the position information to the first device.

According to another embodiment of the system, the first device is adapted to retrieve, based on the position information, a set of rules that is effective at the position of at least one apparatus, the regulations particularly comprising regulations or relevant legislation, and to assess the task-specific capabilities associated with an apparatus also based on the respective set of rules.

According to another embodiment of the system, the first device is adapted to provide configuration data to the software agents of the involved apparatuses, the configuration data being adapted to reconfigure the respective apparatus to provide functions that allow or improve performing the task or a part of the task by the respective apparatus.

According to another embodiment of the system, the first device is adapted to perform the workflow generation process fully autonomously.

According to another embodiment of the system, at least one of the plurality of apparatuses is a remote apparatus, wherein the communication module of the first device and the wireless communication module of the remote apparatus are adapted to communicate and exchange data with each other via the Internet.

According to another embodiment of the system, the workflow data comprises machine-readable instructions for performing a part of the task.

According to another embodiment of the system, the first device is adapted to provide a signal to the software agents of the involved apparatuses to trigger executing the workflow by the respective apparatuses.

A second aspect of some embodiments of the invention pertains to a computer-implemented method for generating a task-specific workflow to perform a measuring task jointly by means by a plurality of electronic apparatuses comprising one or more measuring device, the method comprising providing a workflow generation system comprising a first device having a computing unit, a memory unit and a first communication unit, and providing a software agent to each one of the apparatuses wherein each software agent is adapted to exchange data with the electronic apparatus and wherein providing the software agent comprises installing a software agent on the apparatus or connecting a communication module to the apparatus, wherein a software agent is installed on the communication module.

The provided workflow generation system for instance can be a system according to the first aspect of the invention as described above. Also, the method can be performed by the system.

The method according to this aspect of the invention moreover comprises receiving, by the first device, information about the measuring task to be performed, and performing, particularly fully autonomously, a workflow generation process comprising requesting and receiving, from the software agents, task-specific data of the plurality of apparatuses, wherein the task-specific data comprises information about properties, a position and/or a workload that are assigned to the respective apparatus, assessing, based on the task-specific data, task-specific capabilities for each of the apparatuses, generating, by means of an algorithm and based on the measuring task and on the task-specific capabilities, an optimized workflow for performing the measuring task, the workflow involving one or more of the apparatuses, generating workflow data for each of the involved apparatuses, and providing, via the software agents, the respective workflow data to the involved apparatuses.

According to one embodiment, the method comprises installing at least one of the software agents on one of at least one communication module, wherein the communication module is connected to one of the electronic apparatuses, adapted to exchange data with the apparatus connected to, and comprises a communication unit adapted to communicate and exchange data with the first communication unit and other communication units of other communication modules of the system.

According to another embodiment, the method comprises installing a software agent on at least one of the electronic apparatuses as a software application, particularly provided by means of a mobile app that can be used only for a certain workflow.

According to another embodiment of the method, the measuring task is performed according to the workflow by the involved apparatuses.

According to another embodiment of the method, the plurality of apparatuses comprise a plurality of measuring devices.

According to another embodiment of the method, the plurality of apparatuses comprise one or more geodetic surveying devices and/or industrial measuring devices.

According to another embodiment of the method, the plurality of apparatuses comprise at least one laser scanner, laser tracker or reality capture device, in particular at least two laser scanners, at least two laser trackers or at least two reality capture devices.

According to another embodiment of the method, the plurality of apparatuses comprise at least one laser scanner, and a part of the workflow comprises using the laser scanner for performing a scan of an object or a surrounding with a needed resolution and/or within a given period of time.

According to another embodiment of the method, the first device sends a signal to the software agents of the involved apparatuses, wherein the signal triggers executing the workflow.

According to another embodiment of the method, each of the involved apparatuses executes a part of the workflow according to the workflow data.

According to another embodiment of the method, the software agents are adapted to generate feedback data related to a performance of the task and to provide the feedback data to the first device, and the first device is adapted to evaluate the feedback data and to generate, using machine learning, an improved workflow based on the feedback data.

According to another embodiment of the method, the feedback data comprises information about errors occurring during performing the task, and the software agents generate and provide the feedback data in real time.

According to another embodiment of the method, if the measuring task has been completed successfully, the provided feedback data comprises information related to the successful completion of the task.

According to another embodiment of the method, if the measuring task has not been completed successfully, the provided feedback data comprises information about errors that have occurred during performing the task.

According to another embodiment of the method, the improved workflow comprises repeating a part of the measuring task by the same apparatus in a different way.

According to another embodiment of the method, the improved workflow comprises re-assigning a part of the measuring task to another apparatus.

A third aspect of some embodiments the invention relates to a computer programme product comprising programme code which is stored on a machine-readable medium, or being embodied by an electromagnetic wave comprising a programme code segment, and having computer executable instructions for performing, in particular when run on a computing unit of the first device of a system according to the first aspect of the invention, at least the following steps of the method according to the second aspect of the invention:

requesting and receiving task-specific data of the plurality of apparatuses, assessing, based on the task-specific data, task-specific capabilities for each of the apparatuses, generating, based on the measuring task and on the task-specific capabilities, an optimized workflow for performing the task, the workflow involving one or more of the apparatuses, generating workflow data for each of the involved apparatuses, and transmitting the respective workflow data to the involved apparatuses.

BRIEF DESCRIPTION OF THE DRAWINGS

The invention in the following will be described in detail by referring to exemplary embodiments that are accompanied by figures, in which.

DETAILED DESCRIPTION

Figure 1:
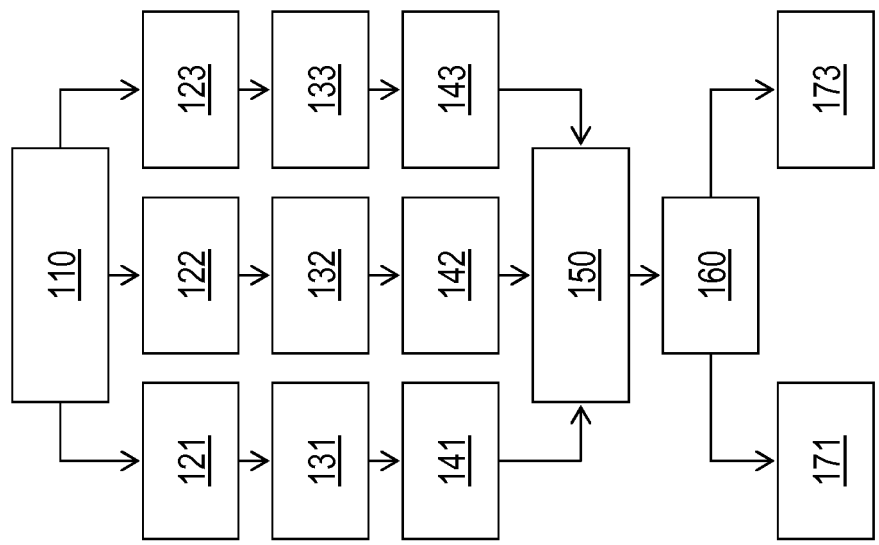
FIG. 1 illustrates a first exemplary embodiment of a method according to the invention.

FIG. 1 shows a flowchart illustrating an exemplary embodiment of a method 100 for generating a workflow according to the invention. In a first step 110 a task is received, e. g. through a user input in a computing device. This device requests task specific data of a plurality of remote devices from a plurality of connected software agents that provide a functionality or feature set. In this example there are three devices A, B and C, so that the method 100 comprises three steps 121-123 that can be performed basically simultaneously: step 121 requesting task specific data of device A, step 122 requesting task specific data of device B and step 123 requesting task specific data of device C. Subsequently, in steps 131, 132 and 133 the requested task specific data of devices A, B and C is received by the device, and in steps 141, 142 and 143 task-specific abilities of devices A, B and C are assessed by the device. Having assessed all devices' abilities, a workflow can be generated by the device in step 150. Workflow data for each device involved is generated in step 160 and subsequently transmitted to the involved devices in steps 171 and 173. In the shown example, as a result of the ability assessments (steps 141-143), the generated workflow only involves two of the three devices, wherefore only these two need to receive the respective workflow data to perform their part of the task.

Figure 2:
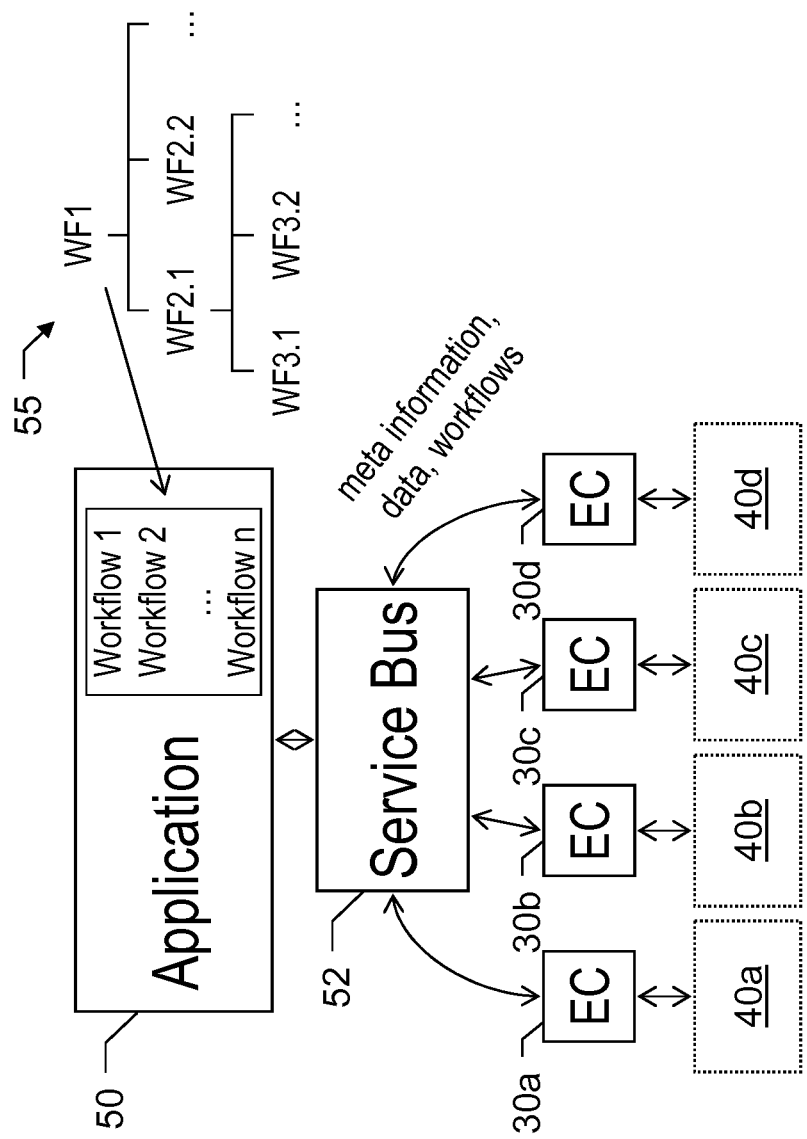
FIG. 2 shows an application for generating workflows.

FIG. 2 shows an application 50 with several software agents provided in agent modules 30a-d connected to devices 40a-d and connected together using a service bus 52. A system according to the invention can comprise several agent modules 30a-d connected together using a service bus or a system and data integration software such as EdgeFrontier (EF) of Intergraph. Applicable integration tools to be used with the application are generally known in the art and disclosed e. g. in the documents EP 3 156 898 A1, US 2008/0005287 A1, US 2008/0010631 A1 and U.S. Pat. No. 7,735,060 B2.

The application 50 may run one or more workflows (WF) as described by a user using a descriptive language like XML or JSON and programming languages like Java Script and Python. These workflows are decomposed into simpler workflows 55 (WF1, WF2.1, WF2.2, WF3.1, WF3.2, . . . ) that can run on individual modules based on a dependency-tree analysis. This analysis works on the principle that if a workflow meets all of its dependencies in a given agent module 30a-d, then it should run locally there. However, if all the dependencies are not met in one module, then a part of the workflow will run at a higher level shown as the service bus 52.

The dependency-tree analysis does not need to be limited to only two levels (module and service bus). In fact, this principle targets the local-most possible execution of the logic in the workflows. If a workflow can run on the module, it will do so. If it needs information from several modules, then these modules can self-coordinate with each other to execute it. In this case the dependencies are expanded to include all of them and exclude all others. Finally, an enterprise service bus can be used if all of the underlying modules are needed as dependencies.

Figure 3A:
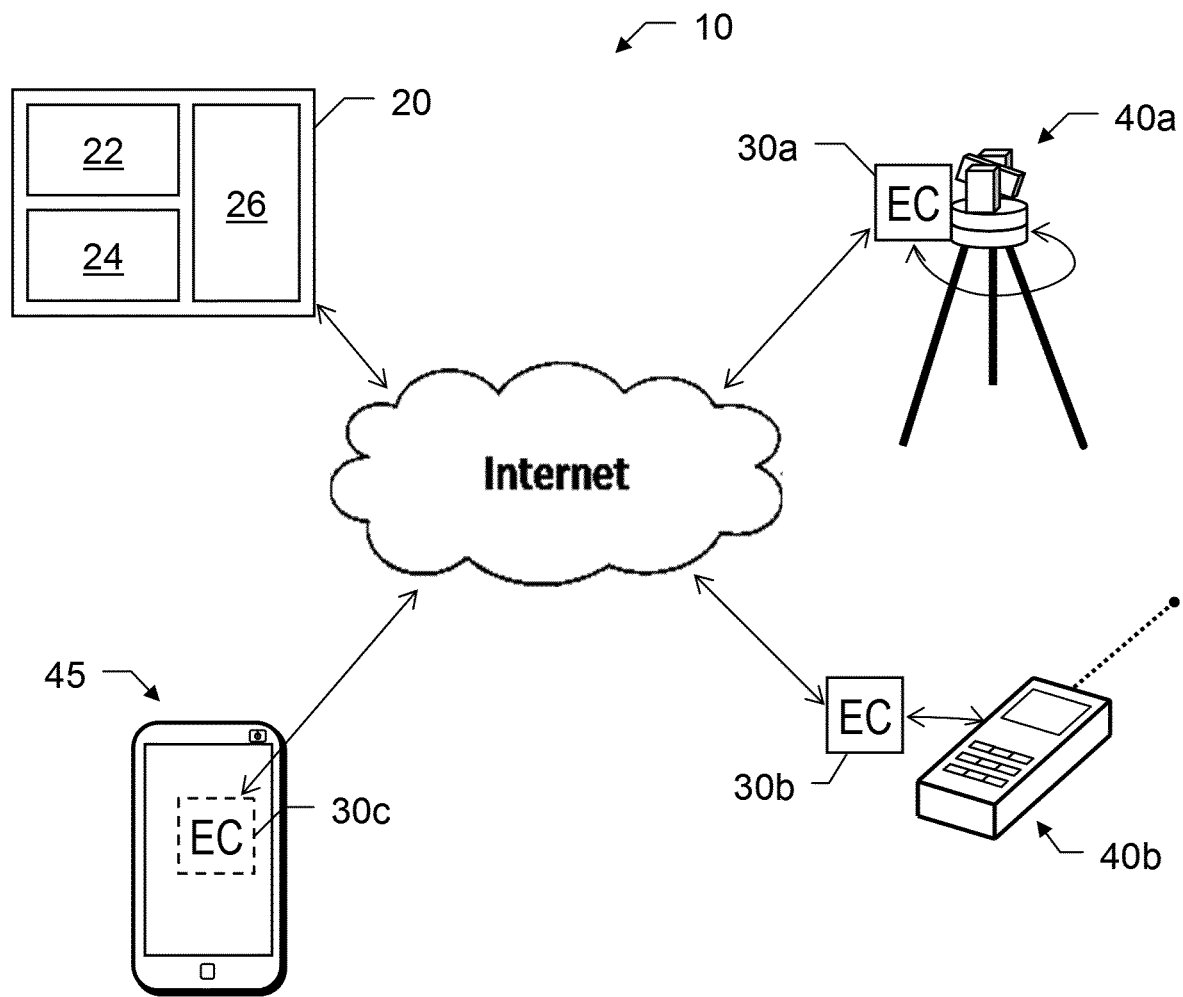
FIG. 3a shows a first exemplary embodiment of a system according to the invention.
Figure 3B:
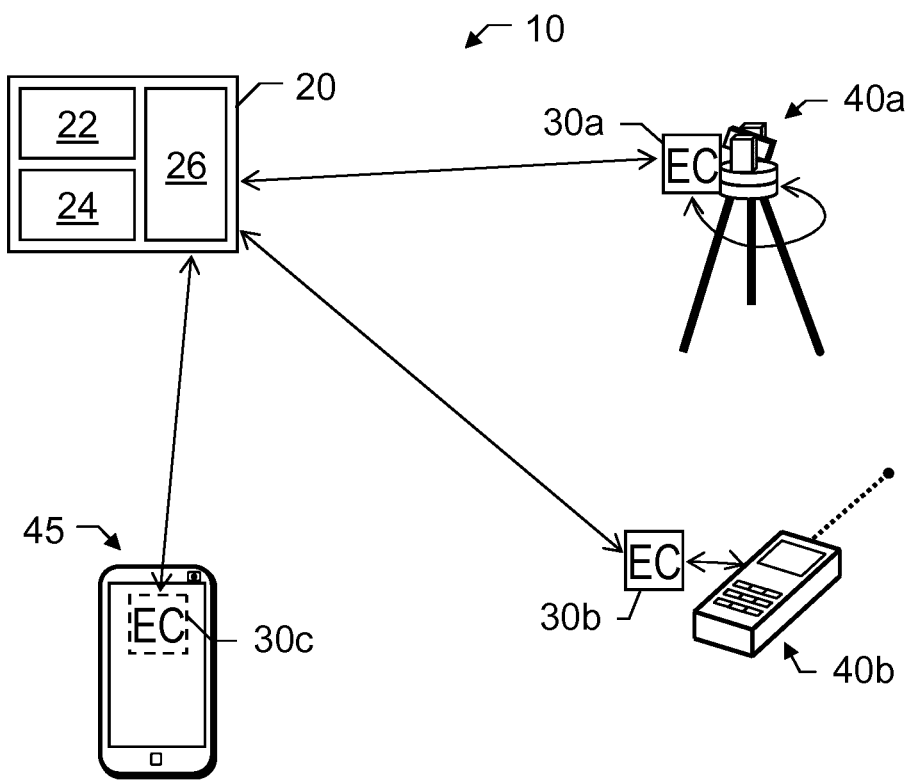
FIG. 3b shows a second exemplary embodiment of a system according to the invention.

FIGS. 3a and 3b illustrate two exemplary embodiments of a system 10 according to the invention. In both embodiments, the system 10 comprises a first user device 20 and three EC software agents 30a-c, wherein two agents are provided in agent modules 30a-b and one software agent 30c is installed directly on an external device 45.

The modules 30a-b with the agents installed thereon are connected to external devices 40a-b and adapted to exchange data with the respective connected device. For instance, such a connection might include using a universal serial bus (USB) or other hardware interface or a wireless data connection such as Bluetooth.

In the shown example, the devices comprise two measuring devices, i.e. a laser scanning device 40a and a hand-held laser distance meter 40b, and a portable electronic device 45 that is assigned to a certain user. For instance, the portable device 45 can be a smartphone or tablet PC or a wearable such as a smart watch. As device 45 is adapted to allow installing external software, the respective agent 30c can be provided as a software application directly in the external device 45 instead of being provided in a module that is connectable to the device 45.

The first device 20 comprises a computing unit 22 comprising a processor, a memory unit 24 adapted for storing data, and a communication unit 26 (e. g. comprising a modem) allowing data interchange with the agents 30a-c.

Alternatively, the first device 20 can be embodied by a plurality of devices, with a user device operated by a user and further devices for performing the computing. Also, the application may run in a cloud.

In the first embodiment shown in FIG. 3a the first device 20 is connected via the Internet with the remote agent modules 30a-b and the portable device 45 comprising the third agent 30c. The first user device 20 may optionally also be embodied by a cloud or a plurality of devices. In the second embodiment of FIG. 3b the first device 20 and the agents 30a-c are grouped locally together and connected wirelessly with each other, e. g. by means of a wireless local area network (WLAN) or by means of mesh networks such as LoRa or ZigBee or Bluetooth.

The first device 20 can be a first user device such as a personal computer that is operated by a user and comprises input means such as keyboard and mouse for entering or selecting a task to be performed by the devices 40a-b, 45. Alternatively, especially in case of the second embodiment, the first user device 20 can be another portable device (such as the second user device 45).

As shown in FIGS. 3a and 3b, the task-specific workflows can be deployed on-demand and in a real-time manner to remote devices 40a-d as well as to other software applications or modules that run on the agent modules 30a-b or the second user device 45 and if needed may include human interaction.

This allows sending customized on-demand step-by-step workflows to guide a user in carrying out a given operation or even allows unguided execution of these workflows. The workflows can comprise instructions for only human, or only machine, or both. It means that advantageously even a novice person can operate complex equipment and can carry out a complex job based on the on-demand workflow.

For example, a guided workflow on how to measure or layout a given object using any measurement devices (for example, as shown, a scanner 40a and a distance meter 40b) is sent on-demand via a cloud directly to the devices and machines. Advantageously, these workflows can be deployed to the agents in the measuring devices without rebuilding or changing the firmware.

In addition, a high-level workflow can be sent to a hand-held device 45 of a user where a human input is needed. The input may simply comprise an authorization or a command to start the operation. In a similar manner, further devices or entities can join the solution to provide additional services in the setup. As an example, an EC-application running on a smart watch can monitor the process and subscribe to the warnings or errors, depending on the system configuration, to alert the user in a real-time manner. Similarly, the same EC-application can be reconfigured in real-time to additionally also track the user. This can be used as part of the solution to provide value-added services like fatigue-monitoring. The wearables (smart watches, AR/VR devices, activity trackers, etc.) can provide a natural extension for edge intelligence platforms to sense and provide data and services to the user. Summarizing, this solution provides all the flexibility to augment an existing solution with new capabilities, to change the behavior of an existing system, or to reconfigure the solution to provide new services.

Advantageously, the device workflow can be adapted to the knowledge of a user and tailored to specific applications, situations and users. Optionally, a level of education or know-how of the operator can be detected, and workflows can be modified according to local regulations. In addition, the workflows can also be generated dynamically to take into consideration the situation at hand, e. g. capabilities of available devices, device health status, and device failure prediction, etc. Feedback about the quality of the job can be computed in real-time based on the achieved results and on past key performance indicators (KPI).

For instance, a step-by-step workflow is sent to the hand-held device 45 of a forensic investigator to accurately and efficiently capture all the relevant details from a crime scene that may also involve different measurement devices 40a-b or other devices necessary to carry out this job. The workflow can be auto-generated based on various factors, e. g. on the nature and location of the crime scene, forensic devices present, technical know-how of the forensic investigator, other persons on agencies involved, etc.

The workflows mentioned above can be generated locally based on the local inputs to the system 10 (FIG. 3b); they can also be computed in a cloud, optionally being also based on inputs from other sources or on the analytics on the previous and current data.

A generated workflow can be deployed via the agent modules 30a-c from the cloud to a user device (e. g. a hand-held device 45) and thus to a human, to the measuring devices 40a-b, or to both.

The workflow may also be deployed only to a user device 45 which controls the other devices 40a-b. For example, the user starts his application in a construction site, the application takes inventory of all available devices and enumerates their capabilities and sends this information to the cloud. The user then enters his wish to carry out a certain action, e. g. check if a building has been built according to the specifications. This input is processed by the cloud/local analytics engine and based on the available devices & resources. A customized workflow is generated and downloaded to the user device 40c which then guides the users, as well as controls the machines, to complete the job at hand.

In addition to the dynamically deployable workflows, the system optionally also provides a functionality to orchestrate new functionalities for the devices 40a-c. These new functionalities may comprise e. g. algorithms, fog analytics, control system strategies or safety & security features. This is possible through a combination of publishing of device information and reflection (="self-description") of the devices' capabilities. The integration of all this information allows the orchestration of algorithms, analytics, etc. with the deployment of new workflows to specific systems. The system can play the role of the orchestrator of many systems with its ability to deploy workflows to other systems. Depending on the situation, one of the agents can also take the role of an orchestrator to manage other agents.

A self-describing system is able to reflect its types, data, capabilities, rules and workflows. If all systems in a solution are self-describing, then the solution itself becomes self-describing as a whole. EC enables all these reflection mechanisms in a system resulting in a self-describing solution composed of systems with EC integrated.

Self-Describing Dynamic Device Types: The EC and intelligent information platform provide mechanisms to define new object types (data, methods, events and event delegates) and deploy them to the agents in a live and running application or system. The agents defined by these object types can self-describe themselves in terms of their functions and the type of information they emit.

If the object types and the workflows are self-describing, the whole system and the thereupon built application become dynamic in nature. In this manner, the complete solution provides a hierarchy of self-describing application components and capabilities.

Figure 4:
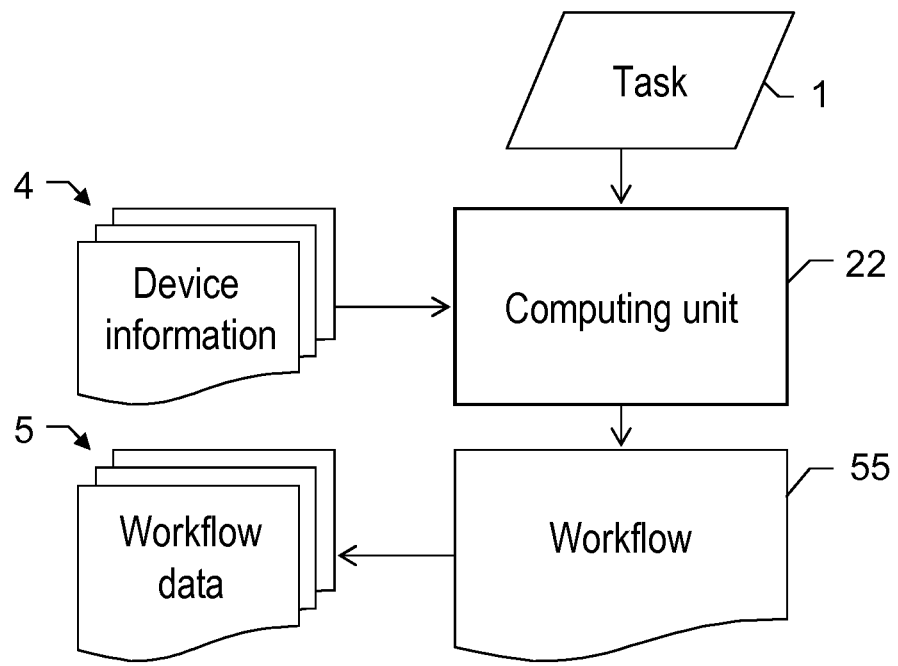
FIG. 4 illustrates the information stream in an exemplary embodiment of a system according to the invention.

FIG. 4 illustrates the information stream in an exemplary embodiment of a system according to the invention. The computing device 22 receives information about a task 1 to be performed. Consequently, it requests and receives task-related device information 4 from the available devices. Based thereon, the abilities of the devices with respect to the task 1 at hand are assessed and an optimized workflow 55 involving all or some of the devices is calculated. Workflow data 5 for each of the involved devices is generated that allows the respective device to perform its part of the task 1 as defined in the optimized workflow 55. The workflow data 5 is then transmitted to the involved devices.

If the device is a machine, the task-related device information 4 comprises information about properties, a position and/or a workload of the machine, and the workflow data 5 comprises machine-readable instructions.

If the device is a user device, the task-related device information 4 comprises information about the user of the device, e. g. task-related knowledge, and the workflow data 5 comprises instructions for a human.

Figure 5:
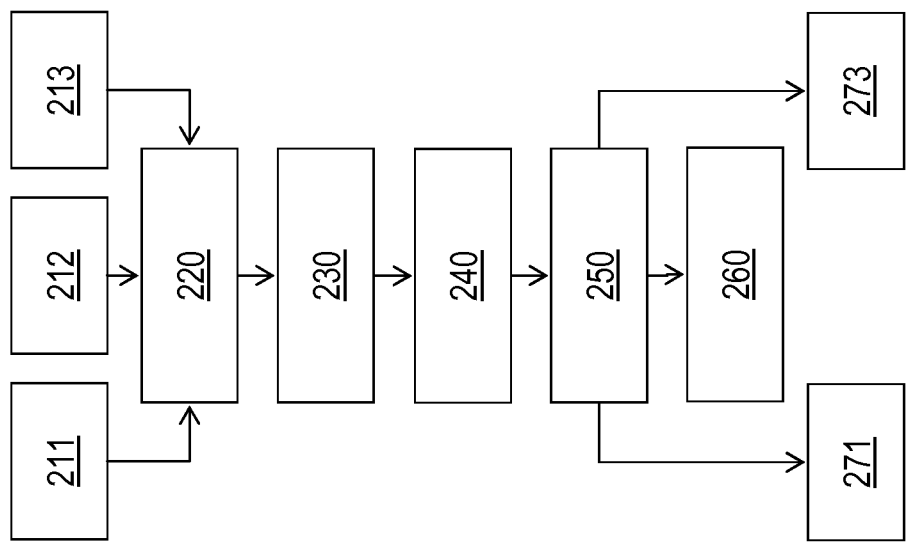
FIG. 5 illustrates a second exemplary embodiment of a method according to the invention.

FIG. 5 shows a flowchart illustrating another exemplary embodiment of a method 200 for generating a workflow.

In this embodiment, the devices are rendered self-describing by connecting agent modules or installing the agents. The method 200 starts with publishing the capabilities of three devices via the EC-modules in steps 211, 212 and 213. Then, in step 220 the capabilities are received and read by a user device, e. g. the first device of FIGS. 3a-b. Based on the devices' capabilities, actions are defined and published by the user device (step 230).

In step 240, customized workflows are defined for each device. This step may either be executed on the user device itself or using computing capacities of a cloud. In step 250, the workflow is sent to the respective devices—if the workflows are defined in the cloud, a workflow is also sent to the user device.

Step 260 comprises executing the workflow on the user device to guide the user through the workflow and optionally to trigger the workflows in the other devices. In steps 271 and 273 the workflows sent to the devices are executed to perform a part of the task. Execution of the workflow may be started when triggered by the user device or autonomously. Particularly, autonomous execution may include using machine learning.

Additionally, the method may comprise sending feedback from the two devices to the user device, informing about successful completion of the task or of non-completion and respective errors. Based on this information, and using e. g. machine learning, appropriate actions can be carried out such as repetition of the task by the same device in the same or an improved manner, re-assignment of the task to another device, etc.

The automatically generated workflow can be improved based on the computation of pre-defined or dynamically computed key performance indicators (KPI). The improved workflow can then be redistributed to all the components of the system running the software agents. This provides a continuously improving and learning intelligence for the task at hand.

The remote deployment of the workflows can also be used to add, remove or alter the capabilities of an existing device or software program. For examples, this may comprise:
  enabling and disabling of geo-fencing on a software or device (machine, app, user) based on the results of a new policy or of analytics from cloud;
  increasing or decreasing the measurement accuracy and/or the speed of a coordinate measurement machine or a sensor;
  automatic increase or decrease of the engine torque of a tractor based on the needs of a self-managing smart agriculture farm; or
  re-planning of individual inspection missions of a swarm of unmanned aerial or ground vehicles (UAV/UGV) based on their exploratory findings or modified mission boundary conditions and/or targets.

Each level of execution and generation of workflows may add additional context to the decision making and processing. The more devices, sensors or data sources are connected to the service bus or intelligent information platform, the more contextual information can be used to generate the workflows. For instance, knowledge about the states of different trades working on a construction site allows generating optimized workflows for all trades.

Figure 6:
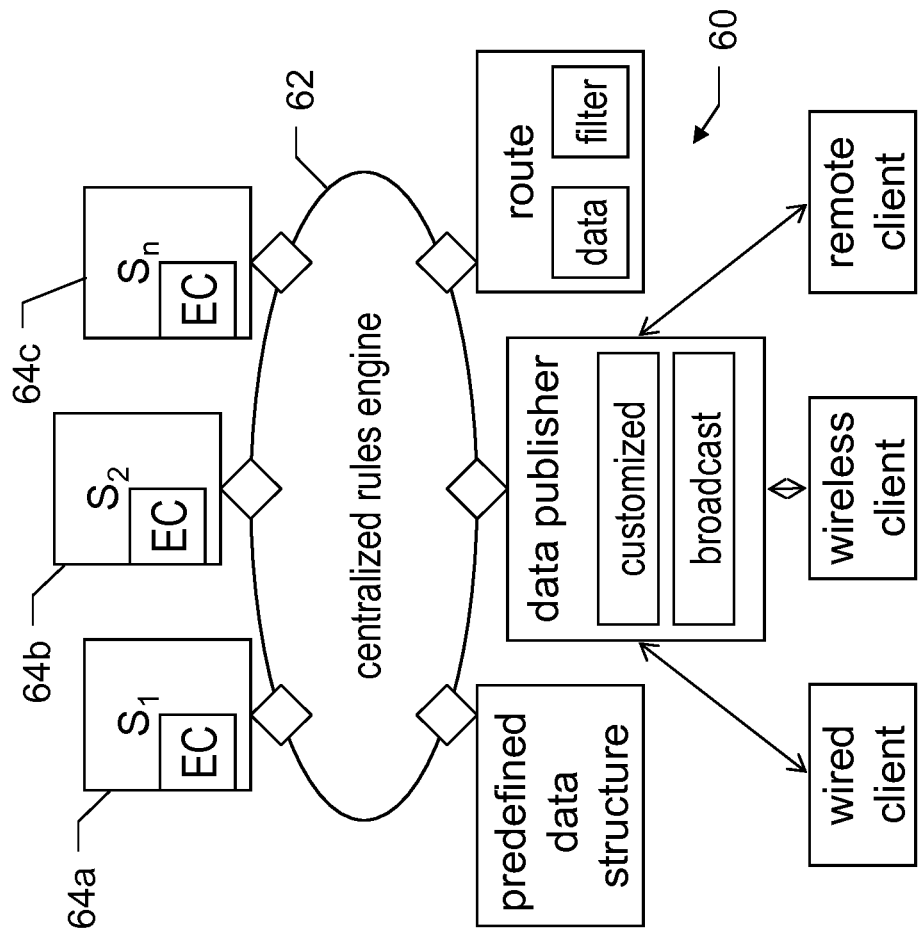
FIG. 6 illustrates an intelligent information platform used together with a system according to the invention.

FIG. 6 illustrates an intelligent information platform used together with a system according to the invention. In general, such a platform is described e. g. in the document EP 3 156 898 A1. The intelligent information platform provides a fully configurable distributed ERP-like (ERP=enterprise resource plan) information processing platform 60 that routes the information, based on certain rules and policies to a centralized decision-making engine 62.

With the present invention, in addition to the system described in EP 3 156 898 A1, by embedding EC agents, the customized adapters 64a-c, as annotated by $S_1 \ldots S_n$, can be made intelligent through edge analytics and dynamically deployable workflows while still residing inside those external systems.

Although the invention is illustrated above, partly with reference to some preferred embodiments, it must be understood that numerous modifications and combinations of different features of the embodiments can be made. All of these modifications lie within the scope of the appended claims.

What is claimed is:

1. A workflow generation system comprising:
  a first device having a computing unit, a memory unit, and a first communication unit; and a plurality of software agents each configured to be used with a plurality of electronic apparatuses comprising at least one measuring device, wherein each software agent is installable on an electronic apparatus of the plurality of electronic apparatuses or installed on a communication module that is configured to be connected to one of the electronic apparatuses and to exchange data with the electronic apparatuses thereto, wherein each software agent is configured to exchange data with the electronic apparatus each software agent is installed on or connected to, wherein:

the first device is configured to:
receive a measuring task and to perform, upon reception of the measuring task, a workflow generation process during which the first device is configured,
request and receive from the plurality of software agents task-specific data of the electronic apparatuses, wherein the task-specific data comprises information about properties, a position, or a workload that are associated with a respective electronic apparatus,
assess, based on the task-specific data, task-specific capabilities associated with each of the electronic apparatuses,
generate, based on the measuring task and on the task-specific capabilities, an optimized workflow for performing the measuring task, the workflow involving one or more of the electronic apparatuses,
generate workflow data for each of the one or more electronic apparatuses involved in the optimized workflow, the workflow data allowing the respective electronic apparatus to perform a part of the measuring task,
provide the workflow data to the software agents of the one or more electronic apparatuses involved in the optimized workflow, and
perform the optimized workflow for performing the measuring task with the one or more electronic apparatuses.

2. The workflow generation system according to claim 1, wherein at least one of the software agents is installed on a communication module that is configured to be connected to one of the electronic apparatuses and to exchange data with the electronic apparatuses connected thereto, wherein each of the communication modules comprises a communication unit configured to communicate and exchange data with the first communication unit and other communication units of other communication modules of the workflow generation system.

3. The workflow generation system according to claim 1, wherein the workflow generation system further comprises one or more of the plurality of electronic apparatuses.

4. The workflow generation system according to claim 1, wherein the plurality of apparatuses comprise a plurality of measuring devices.

5. The workflow generation system according to claim 1, wherein the plurality of apparatuses comprise at least one laser scanner.

6. The workflow generation system according to claim 1, wherein the software agents are configured to generate feedback data related to a performance of the measuring task and to provide the feedback data to the first device.

7. The workflow generation system according to claim 6, wherein the first device is configured to store feedback data related to a multitude of measuring tasks and comprises a machine-learning algorithm that is configured to evaluate the stored feedback data.

8. The workflow generation system according to claim 7, wherein the first device is configured to generate the workflow using the evaluated feedback data of the machine-learning algorithm.

9. The workflow generation system according to claim 7, wherein the first device is configured to evaluate the feedback data and to generate an improved workflow based on the feedback data and using the evaluated feedback data of the machine-learning algorithm.

10. The workflow generation system according to claim 9, wherein the improved workflow comprises repeating a part of the task by the same electronic apparatus in a different way.

11. The workflow generation system according to claim 9, wherein the improved workflow comprises re-assigning a part of the task to another electronic apparatus.

12. The workflow generation system according to claim 7, wherein if the task has not been completed successfully, the evaluated feedback data comprises information about errors that have occurred during performing the task.

13. The workflow generation system according to claim 6, wherein the evaluated feedback data comprises information about errors occurring during performing the task, and the software agents are configured to generate and provide the feedback data in real time.

14. The workflow generation system according to claim 6, wherein if the task has been completed successfully, the evaluated feedback data comprises information related to the successful completion of the task.

15. The workflow generation system according to claim 1, wherein the first device is configured as a hand-held or wearable user device comprising a display, and workflow data is displayable on the display, the workflow data comprising instructions for a human.

16. The workflow generation system according to claim 15, wherein the instructions comprise a step-by-step guidance for the user of the first device for performing a part of the task.

17. The workflow generation system according to claim 1, wherein the workflow generation system further comprises at least one user device comprising a display, wherein the task-specific data associated with the user device comprise information about a user of the second user device, the task-specific capabilities associated with the user device comprise task-specific capabilities of the user of the user device, and the workflow data is transmitted to the user device comprises instructions for a human.

18. The workflow generation system according to claim 17, wherein at least one device of the plurality of apparatuses is configured as the at least one user device.

19. The workflow generation system according to claim 17, wherein the instructions comprise a step-by-step guidance for the user of the user device for performing a part of the task.

20. The workflow generation system according to claim 17, wherein the at least one user device is assigned to the at least one measuring device, and the instructions comprise a guidance for the user of the user device related to a setup of the at least one measuring device that is necessary for performing a part of the task.

21. The workflow generation system according to claim 1, wherein the user device is configured as a hand-held or wearable device.

22. The workflow generation system according to claim 21, wherein the electronic apparatuses comprise a localization unit configured for determining a position of the respective electronic apparatus and to provide the position information to the first device.

23. The workflow generation system according to claim 21, wherein the first device is configured:
to retrieve, based on the position information, a set of rules that are effective at the position of at least one electronic apparatus, the set of rules particularly comprising regulations or relevant legislation, and
to assess the task-specific capabilities associated with an electronic apparatus also based on the respective set of rules.

24. The workflow generation system according to claim 1, wherein the first device is configured to generate the workflow further based on position information.

25. The workflow generation system according to claim 1, wherein the first device is configured to provide configuration data to the software agents of the one or more electronic apparatuses involved in the optimized workflow, the configuration data being configured to reconfigure the respective electronic apparatus to provide functions that allow or improve performing the task or a part of the task by the respective electronic apparatus.

26. The workflow generation system according to claim 1, wherein the first device is configured to perform the workflow generation process fully autonomously.

27. The workflow generation system according to claim 1, wherein at least one of the plurality of electronic apparatuses is a remote apparatus, wherein the communication module of the first device and the wireless communication module of the remote apparatus are configured to communicate and exchange data with each other via the Internet.

28. The workflow generation system according to claim 1, wherein the workflow data comprises machine-readable instructions for performing a part of the task.

29. The workflow generation system according to claim 1, wherein the first device is configured to provide a signal to the software agents of the one or more electronic apparatuses involved in the optimized workflow to trigger executing the optimized workflow by the respective electronic apparatuses.

30. A computer implemented method for generating a task-specific workflow to perform a measuring task jointly by means by a plurality of electronic apparatuses comprising at least one measuring device, the method comprising:
providing a workflow generation system comprising a first device having a computing unit, a memory unit, and a first communication unit;
providing a software agent to each one of the electronic apparatuses wherein each software agent is configured to exchange data with the electronic apparatus and wherein providing the software agent comprises installing a software agent on the electronic apparatus or connecting a communication module to the electronic apparatuses wherein a software agent is installed on the communication module;
receiving, by the first device, information about a measuring task to be performed, and performing a workflow generation process comprising:
requesting and receiving, from the software agents task-specific data of the plurality of electronic apparatuses, wherein the task-specific data comprises information about properties, a position, or a workload that are assigned to the respective electronic apparatuses, assessing, based on the task-specific data, task-specific capabilities for each of the electronic apparatuses,
generating, by means of an algorithm and based on the measuring task and on the task-specific capabilities, an optimized workflow for performing the measuring task, the optimized workflow involving one or more of the electronic apparatuses,
generating workflow data for each of the involved electronic apparatuses,
providing, via the software agents, the respective workflow data to the involved one or more electronic apparatuses, and
performing the optimized workflow for performing the measuring task with the involved one or more electronic apparatuses.

31. The computer implemented method according to claim 30, further comprising:
installing at least one of the software agents on one of at least one communication module, wherein the communication module is connected to one of the electronic apparatuses and configured to exchange data with the electronic apparatuses, and comprises a communication unit configured to communicate and exchange data with the first communication unit and other communication units of other communication modules.

32. The computer implemented method according to claim 30, further comprising installing a software agent on at least one of the electronic apparatuses as a software application.

33. The computer implemented method according to claim 30, wherein the measuring task is performed according to the workflow by the involved electronic apparatuses.

34. The computer implemented method according to claim 30, wherein the plurality of electronic apparatuses comprise a plurality of measuring devices.

35. The computer implemented method according to claim 30, wherein the plurality of electronic apparatuses comprise one or more geodetic surveying devices or industrial measuring devices.

36. The computer implemented method according to claim 30, wherein the plurality of electronic apparatuses comprise at least one laser scanner, laser tracker or reality capture device, at least two laser trackers or at least two reality capture devices.

37. The computer implemented method according to claim 30, wherein the plurality of apparatuses comprise at least one laser scanner, and a part of the workflow comprises using the laser scanner for performing a scan of an object or a surrounding with a needed resolution or within a given period of time.

38. The computer implemented method according to claim 30, wherein the first device sends a signal to the software agents of the involved electronic apparatuses, wherein the signal triggers executing the workflow.

39. The computer implemented method according to claim 30, wherein each of the involved apparatuses executes a part of the workflow according to the workflow data.

40. The computer implemented method according to claim 30, wherein the software agents are configured to generate feedback data related to a performance of the task and to provide the feedback data to the first device; and the first device is configured to evaluate the feedback data and to generate, using machine learning, an improved workflow based on the feedback data.

41. The computer implemented method according to claim 40, wherein the feedback data comprises information about errors occurring during performing the task, and the software agents generate and provide the feedback data in real time.

42. The computer implemented method according to claim 40, wherein if the task has been completed successfully, the feedback data comprises information related to the successful completion of the task.

43. The computer implemented method according to claim 40, wherein if the task has not been completed successfully, the feedback data comprises information about errors that have occurred during performing the task.

44. The computer implemented method according to claim 40, wherein the improved workflow comprises repeating a part of the task by the same electronic apparatus in a different way.

45. The computer implemented method according to claim 30, wherein the improved workflow comprises re-assigning a part of the task to another electronic apparatus.

46. A computer program product comprising program code which is stored on a non-tangible machine-readable medium and having non-transitory computer-executable instructions for generating a task-specific workflow to perform a measuring task jointly by means by a plurality of electronic apparatuses comprising at least one measuring device, the program code comprising program code for receiving, by a first device, information about the measuring task to be performed and for performing a workflow generation process, wherein:
    the first device is part of a workflow generation system and comprises a computing unit, a memory unit, and a first communication unit;
    a software agent is provided to each one of the electronic apparatuses, wherein each software agent is configured to exchange data with the electronic apparatus: and
    the workflow generation process comprises:
        requesting and receiving task-specific data of the plurality of apparatuses,
        assessing, based on the task-specific data, task-specific capabilities for each of the electronic apparatuses,
        generating, based on the measuring task and on the task-specific capabilities, an optimized workflow for performing the task, the workflow involving one or more of the electronic apparatuses,
        generating workflow data for each of the involved electronic apparatuses,
        transmitting the respective workflow data to the involved electronic apparatuses, and
        performing the optimized workflow for performing the measuring task with the involved one or more electronic apparatuses.

* * * * *